(12) United States Patent
Hasegawa et al.

(10) Patent No.: US 9,880,050 B2
(45) Date of Patent: Jan. 30, 2018

(54) OPTICAL TRANSMISSION MODULE

(71) Applicant: Oclaro Japan, Inc., Kanagawa (JP)

(72) Inventors: Takayuki Hasegawa, Kanagawa (JP);
Daisuke Murakami, Kanagawa (JP);
Takeshi Yamashita, Kanagawa (JP)

(73) Assignee: OCLARO JAPAN, INC., Kanagawa (JP)

( * ) Notice: Subject to any disclaimer, the term of this patent is extended or adjusted under 35 U.S.C. 154(b) by 168 days.

(21) Appl. No.: 15/072,398

(22) Filed: Mar. 17, 2016

(65) Prior Publication Data

US 2016/0282174 A1    Sep. 29, 2016

(30) Foreign Application Priority Data

Mar. 25, 2015  (JP) ................. 2015-062108

(51) Int. Cl.
| | | |
|---|---|---|
| *G01J 1/02* | (2006.01) | |
| *G02B 6/42* | (2006.01) | |
| *G01J 1/04* | (2006.01) | |

(52) U.S. Cl.
CPC ........... *G01J 1/0214* (2013.01); *G01J 1/0204* (2013.01); *G01J 1/0271* (2013.01); *G01J 1/0411* (2013.01); *G01J 1/0414* (2013.01); *G02B 6/4286* (2013.01)

(58) Field of Classification Search
CPC ...... G01J 1/0214; G01J 1/0271; G01J 1/0411; G01J 1/0204; G01J 1/0414; G02B 6/4286
See application file for complete search history.

(56) References Cited

U.S. PATENT DOCUMENTS 9,006,643 B2 * 4/2015 Lin .................... G02B 6/4214
250/227.11

FOREIGN PATENT DOCUMENTS

JP         2013-148825 A      8/2013

* cited by examiner

*Primary Examiner* — Tony Ko
(74) *Attorney, Agent, or Firm* — Mattingly & Malur, PC (57) ABSTRACT

An optical transmission module includes: a package; a plurality of light-emitting elements each emitting light in the interior of the package; a beam splitter splitting the light into transmitted light and split light; a plurality of light-receiving elements each including a light-receiving surface on which the split light is incident in the interior of the package, for monitoring light outputs of the plurality of light-emitting elements; and a first light-shielding film provided between the plurality of light-emitting elements and the beam splitter and including a plurality of first holes for the light to propagate to the beam splitter, wherein the plurality of light-receiving elements are disposed with the light-receiving surfaces facing the beam splitter.

11 Claims, 5 Drawing Sheets

OPTICAL TRANSMISSION MODULE

CROSS-REFERENCE TO RELATED APPLICATION

The present application claims priority from Japanese application JP2015-062108 filed on Mar. 25, 2015, the content of which is hereby incorporated by reference into this application.

BACKGROUND OF THE INVENTION

1. Field of the Invention

The present invention relates to an optical transmission module.

2. Description of the Related Art

JP 2013-148825 A discloses an optical module.

An optical transmission module that converts an electric signal to an optical signal and outputs the optical signal is provided with a light-receiving element for monitoring light emitted from a light-emitting element. The light-receiving element monitors a light output emitted from the light-emitting element, and the optical transmission module controls, based on the monitoring result, the intensity of the light emitted from the light-emitting element so as to be constant.

It is considered that an optical transmission module provided with a plurality of light-emitting elements is preferably provided with as many light-receiving elements as the light-emitting elements for monitoring light outputs emitted from the light-emitting elements.

Because of the demand for the miniaturization of the optical transmission module in recent years, when the plurality of light-emitting elements and the plurality of light-receiving elements are densely provided in one package, it is considered that leakage light or stray light from an adjacent light-emitting element, other than light emitted from one light-emitting element desired to be originally monitored, may also be incident on one light-receiving element.

When the leakage light or the like described above is incident on the light-receiving element, the light-receiving element cannot obtain a precise monitoring result. As a result, it may become difficult to control the intensity of the light emitted from the one light-emitting element so as to be constant.

SUMMARY OF THE INVENTION

It is an object of the invention to provide an optical transmission module provided with a plurality of light-emitting elements and a plurality of light-receiving elements, in which each of the plurality of light-receiving elements accurately monitors light emitted from the light-emitting element, and thus the intensities of the lights emitted from the plurality of light-emitting elements are controlled so as to be more constant.

Moreover, the above and other objects and novel features of the invention will be apparent from the description of the specification and the accompanying drawings.

An embodiment of the invention is directed to an optical transmission module that converts an electric signal to an optical signal and outputs the optical signal, including: a package; a plurality of light-emitting elements each emitting light in the interior of the package; a beam splitter splitting the light into transmitted light and split light; a plurality of light-receiving elements each including a light-receiving surface on which the split light is incident in the interior of the package, for monitoring light outputs of the plurality of light-emitting elements; and a first light-shielding film provided between the plurality of light-emitting elements and the beam splitter and including a plurality of first holes for the light to propagate to the beam splitter, wherein the plurality of light-receiving elements are disposed with the light-receiving surfaces facing the beam splitter.

Moreover, the optical transmission module according to the embodiment of the invention may further include collimator lenses provided between the plurality of light-emitting elements and the beam splitter and converting the light to parallel light, the first light-shielding film may be provided between the collimator lenses and the beam splitter, and the plurality of first holes may be formed so as to allow the parallel light to propagate to the beam splitter.

Moreover, the first light-shielding film may be directly formed on a side of the beam splitter facing the collimator lenses.

Moreover, the optical transmission module according to the embodiment of the invention may further include a microlens array provided between the plurality of light-emitting elements and the beam splitter and including a plurality of collimator lenses converting the light to parallel light and arranged side by side, the first light-shielding film may be provided between the microlens array and the beam splitter, and the plurality of first holes may be formed so as to allow the parallel light to propagate to the beam splitter.

Moreover, the microlens array may be composed of the plurality of collimator lenses coupled with each other, and the first light-shielding film may be directly formed on a side of the microlens array facing the beam splitter, so as to fill a space between the plurality of collimator lenses arranged side by side.

Moreover, the optical transmission module according to the embodiment of the invention may further include a microlens array provided between the plurality of light-emitting elements and the beam splitter and including a plurality of collimator lenses converting the light to parallel light and arranged side by side, the first light-shielding film may be provided between the plurality of light-emitting elements and the microlens array, and the plurality of first holes may be formed so as to allow the light, before being converted to parallel light, to propagate to the plurality of collimator lenses.

Moreover, the microlens array may be composed of the plurality of collimator lenses coupled with each other, and the first light-shielding film may be directly formed on a side of the microlens array facing the plurality of light-emitting elements, so as to fill a space between the collimator lenses arranged side by side.

Moreover, the optical transmission module according to the embodiment of the invention may further include a second light-shielding film provided between the plurality of light-receiving elements and the beam splitter and including a plurality of second holes for the split light to propagate to the light-receiving surface.

Moreover, the second light-shielding film may be directly formed on a side of the beam splitter facing the plurality of light-receiving elements.

Moreover, the optical transmission module according to the embodiment of the invention may further include: a repeater for guiding the transmitted light in the interior of the package and transmitting the transmitted light to the outside; and a third light-shielding film provided between the repeater and the beam splitter and including a plurality of third holes for the transmitted light to propagate to the repeater.

Moreover, the third light-shielding film may be directly formed on a side of the beam splitter facing the repeater.

DETAILED DESCRIPTION OF THE INVENTION

First Embodiment

First, an outline of an optical transmission module according to a first embodiment of the invention will be described with reference to FIGS. 1 to 3.

Figure 1:
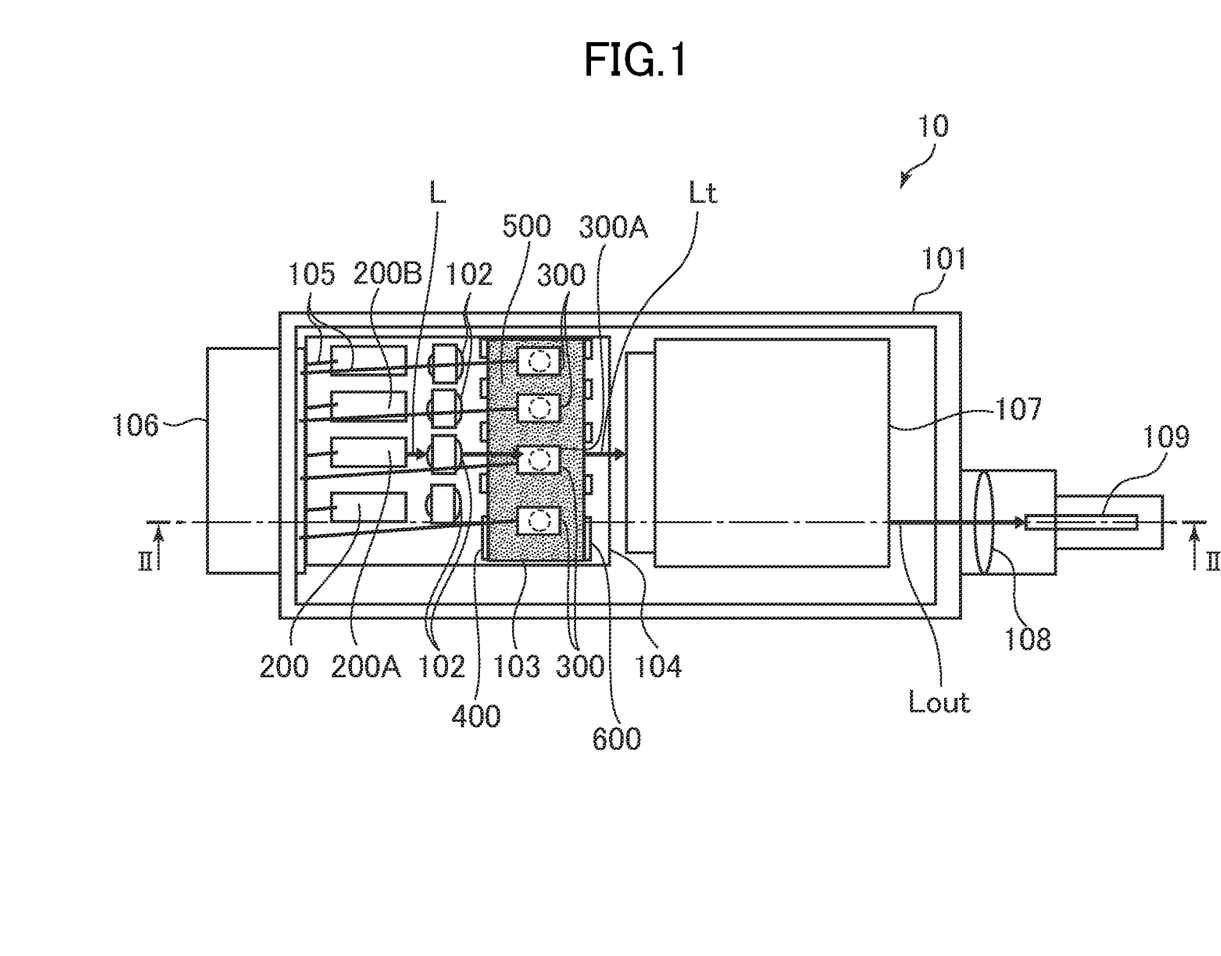
FIG. 1 is a diagram showing the state of the interior of an optical transmission module according to a first embodiment of the invention, viewed from above.

FIG. 1 is a diagram showing the state of the interior of the optical transmission module according to the first embodiment of the invention, viewed from above. FIG. 2 is a diagram showing a cross-section along the section line II-II in FIG. 1, showing the configuration of the optical transmission module according to the first embodiment. FIG. 3 is a perspective view showing a beam splitter used for the optical transmission module according to the first embodiment.

The optical transmission module 10 according to the first embodiment includes: a package 101; a plurality of light-emitting elements 200 each emitting light L by space transmission in the interior of the package 101; a beam splitter (optical demultiplexer) 103 splitting the light L into transmitted light Lt and split light Lb; a repeater 107 for guiding the transmitted light in the interior of the package 101 and transmitting the transmitted light to the outside; a plurality of light-receiving elements 300 each including a light-receiving surface on which the split light Lb is incident in the interior of the package 101, for monitoring light outputs of the plurality of light-emitting elements 200; and at least one first light-shielding film 400 provided between the plurality of light-emitting elements 200 and the beam splitter 103 and including a plurality of holes for light to propagate to the beam splitter 103. The first light-shielding film 400 prevents stray light that does not pass through the plurality of holes formed in the first light-shielding film 400 from being incident on the plurality of light-receiving elements 300.

Figure 2:
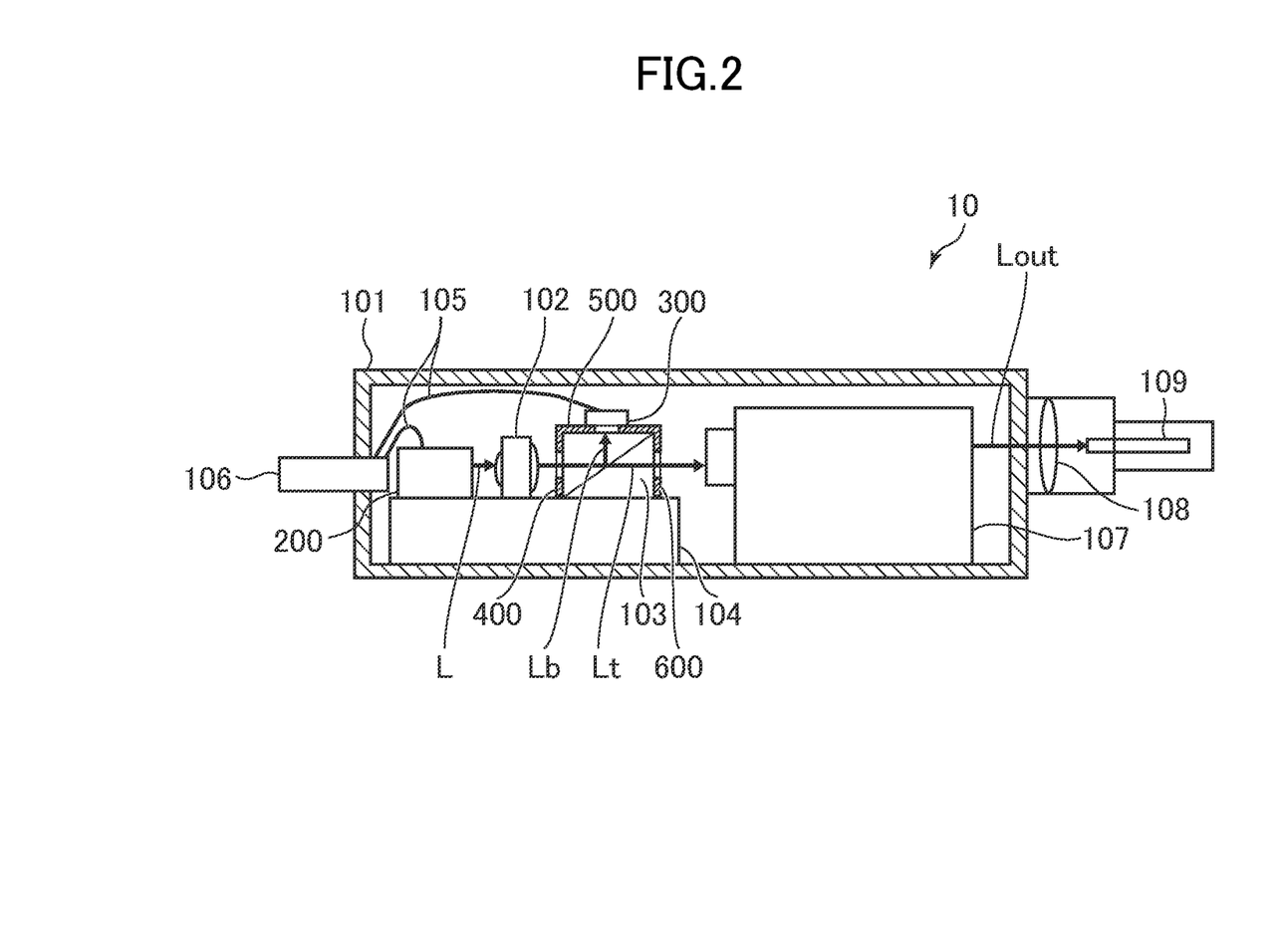
FIG. 2 is a diagram showing a cross-section along the section line II-II in FIG. 1, showing the configuration of the optical transmission module according to the first embodiment.

As shown in FIGS. 1 and 2, the light-emitting elements 200, collimator lenses 102, and the beam splitter 103 may be provided on a submount substrate 104 provided in the package 101 in the optical transmission module 10 according to the first embodiment.

The submount substrate 104 used for the optical transmission module 10 according to the first embodiment is formed of a ceramic material, and more specifically, may be formed of aluminum nitride, aluminum oxide, or the like.

Moreover, the submount substrate 104 may be formed of a material that blocks light emitted from the plurality of light-emitting elements 200. When the submount substrate 104 is formed of a ceramic material, the submount substrate 104 blocks the light emitted from the plurality of light-emitting elements 200, and thus stray light does not enter the beam splitter 103 through the submount substrate 104.

The submount substrate 104 can be substituted with a thin film submount, and a thin film submount may be used in the optical transmission module 10 according to the first embodiment.

In the optical transmission module 10 according to the first embodiment, the plurality of light-receiving elements 300 are provided on the beam splitter 103. The plurality of light-emitting elements 200 and the plurality of light-receiving elements 300 may be each connected with a feedthrough 106 via a wire 105 for establishing electrical connection to the outside as shown in, for example, FIGS. 1 and 2.

Moreover, the interior of the package 101 of the optical transmission module 10 according to the first embodiment may be in a vacuum state, or may be filled with an inert gas (for example, nitrogen gas or the like). Filling the interior of the package 101 with an inert gas as described above enhances the reliability of the optical transmission module 10.

As shown in FIG. 1, the plurality of light-emitting elements 200 are arranged side by side and accommodated in the package 101. Each of the plurality of light-emitting elements 200 emits the light L at a predetermined wavelength. The lights L emitted from the plurality of light-emitting elements 200 are emitted so as to be directed in the same direction. The wavelength of the light L is, for example, around 1.3 µm or around 1.55 µm, which is mainly used in optical communications.

The light-emitting element 200 provided in the package 101 may be realized by, for example, a semiconductor laser. Moreover, the plurality of light-emitting elements 200 may emit lights L at different wavelengths.

As shown in FIGS. 1 and 2, in the optical transmission module 10 according to the first embodiment, each of the lights L emitted from the plurality of light-emitting elements 200 by space transmission in the interior of the package 101 passes through the collimator lens 102 provided in the direction in which the light L is emitted, and thus is converted to parallel light.

The collimator lens 102 provided in the optical transmission module 10 according to the first embodiment is provided on the extended line of the optical axis of each of the lights L emitted from the plurality of light-emitting elements 200 as shown in FIGS. 1 and 2, and as many collimator lenses 102 as the light-emitting elements 200 are provided.

The light L converted to the parallel light by the collimator lens 102 is then incident on the beam splitter 103, and split into the transmitted light Lt and the split light Lb at a predetermined ratio. That is, the beam splitter 103 emits the transmitted light Lt in the optical axis direction (emitting direction of the light-emitting element 200) of each of the lights L emitted from the plurality of light-emitting elements 200, and emits the split light Lb in a direction vertical to the optical axis. In the optical transmission module 10 according to the first embodiment, the split light Lb is emitted by the beam splitter 103 in the upper direction in FIG. 2.

Then, a plurality of the split lights Lb directed upward by the beam splitter 103 are incident on the light-receiving surfaces of the light-receiving elements 300. As shown in FIG. 2, each of the light-receiving elements 300 is disposed on the beam splitter 103, and the light-receiving surfaces of the plurality of light-receiving elements 300 are provided on the side facing the beam splitter 103.

In the specification of the application, the light-receiving surface of the light-receiving element 300 represents a surface on which light to be received is incident, and further, an area of the incident surface having a light-receiving function. The light-receiving element 300 is realized by a photodiode or the like, which roughly includes three types: a front surface incident type, a back surface incident type, and an end face incident type (waveguide type).

Photodiodes have a structure in which an absorbing layer that converts light into electricity is stacked on a semiconductor substrate, and are generally a substantially rectangular parallelepiped as a whole. A type in which the light to be received is incident from a surface on the side on which the absorbing layer is stacked is referred to as the front surface incident type; conversely, a type in which the light to be received is incident from a surface on the semiconductor substrate side is referred to as the back surface incident type; and a type in which the light to be received is incident from a surface in a direction vertical to the absorbing layer is referred to as the end face incident type.

That is, a surface on which the light to be received is incident is different depending on the type of the light-receiving element 300. In any case, however, the side of the surface on which the light to be received is incident is disposed so as to be the side facing the beam splitter 103 in the specification of the application.

Moreover, the transmitted light Lt, which is a portion of the light L emitted from the light-emitting element 200 and has passed through the beam splitter 103, is incident on the repeater 107 to combine light. The transmitted light Lt is combined with light at the repeater 107, and output as light Lout to be transmitted to the outside. Thereafter, the light Lout output from the repeater 107 is condensed by a condensing lens 108, and incident on a receptacle terminal 109 that is connected with a receptor.

By the way, the light intensity of the light L emitted from the light-emitting element 200 realized by a semiconductor laser or the like changes due to the influence of ambient temperature or the like even if a current supplied to the light-emitting element 200 is constant.

In order to make the light Lout output from the receptacle terminal 109 have a constant intensity, the intensity of the light L emitted from the light-emitting element 200 needs to be constant irrespective of external temperature changes or the like.

The light-receiving elements 300 are provided for monitoring the light outputs of the light-emitting elements 200. The light outputs of the light-emitting elements 200 are subjected to auto power control (APC) so as to be constant based on the monitoring result.

Here, the light L emitted from the light-emitting element 200 has a predetermined radiation angle. Therefore, not all of the radiated light L is directed in the optical axis direction, but there is a component of light not incident on the collimator lens 102. Further, there is also a component of light caused due to the fact that, for example, the transmitted light Lt after passing through the beam splitter, or the like, is not incident on the repeater 107 but is reflected by the repeater 107.

The component itself of light not incident on the collimator lens 102, or the reflection of the component of the light or the above-described component of the light reflected by the repeater 107 in the package 101 becomes stray light, which may enter the light-receiving element 300 from a surface other than the light-receiving surface.

The optical transmission module 10 according to the first embodiment includes the plurality of light-emitting elements 200. If so, stray light originating from each of the plurality of light-emitting elements 200 is caused. For example, when stray light from a light-emitting element 200B other than a light-emitting element 200A of the plurality of light-emitting elements 200 enters a light-receiving element 300A for monitoring light from the light-emitting element 200A, the light-receiving element 300A cannot precisely monitor the intensity of the light from the light-emitting element 200A. As a result, the control of the light-emitting element 200, which is performed based on the monitoring result, becomes difficult.

In order to suppress the influence of stray light on the light-receiving element 300, the optical transmission module 10 according to the first embodiment is provided with at least one first light-shielding film 400 provided between the plurality of light-emitting elements 200 and the beam splitter 103 and including the plurality of holes for the light L to propagate to the beam splitter 103. Then, the first light-shielding film 400 prevents stray light that does not pass through the plurality of holes formed in the first light-shielding film 400 from being incident on the plurality of light-receiving elements 300. Since the first light-shielding film 400 is provided, the influence of stray light is suppressed.

The first light-shielding film 400 used for the optical transmission module 10 according to the first embodiment is, for example, a film formed using a material that blocks (reflects and/or absorbs) the light L emitted from the light-emitting element 200.

For example, the first light-shielding film 400 may be formed by vapor depositing metal that reflects the light L emitted from the light-emitting element 200 on, for example, a base material forming the first light-shielding film 400, or may be formed using a material in which a compound or the like that absorbs the light emitted from the light-emitting element 200 is dispersed.

More specifically, the first light-shielding film 400 may be formed by appropriately selecting a chemical vapor deposition method, a printing method, or a surface treatment method such as plating according to the material constituting the first light-shielding film 400.

Referring to FIG. 2, the first light-shielding film 400 in the optical transmission module 10 according to the first embodiment is provided between the collimator lens 102 and the beam splitter 103, and includes the plurality of holes for the parallel light to propagate to the beam splitter 103.

Moreover, the first light-shielding film 400 may be directly formed on the side of the beam splitter 103 facing the collimator lens 102.

The optical transmission module 10 according to the first embodiment including the first light-shielding film 400 suppresses the influence of stray light entering the beam splitter 103 from the plurality of light-emitting elements 200 side of the beam splitter 103, so that an advantageous effect of the invention of the application is further increased.

Figure 3:
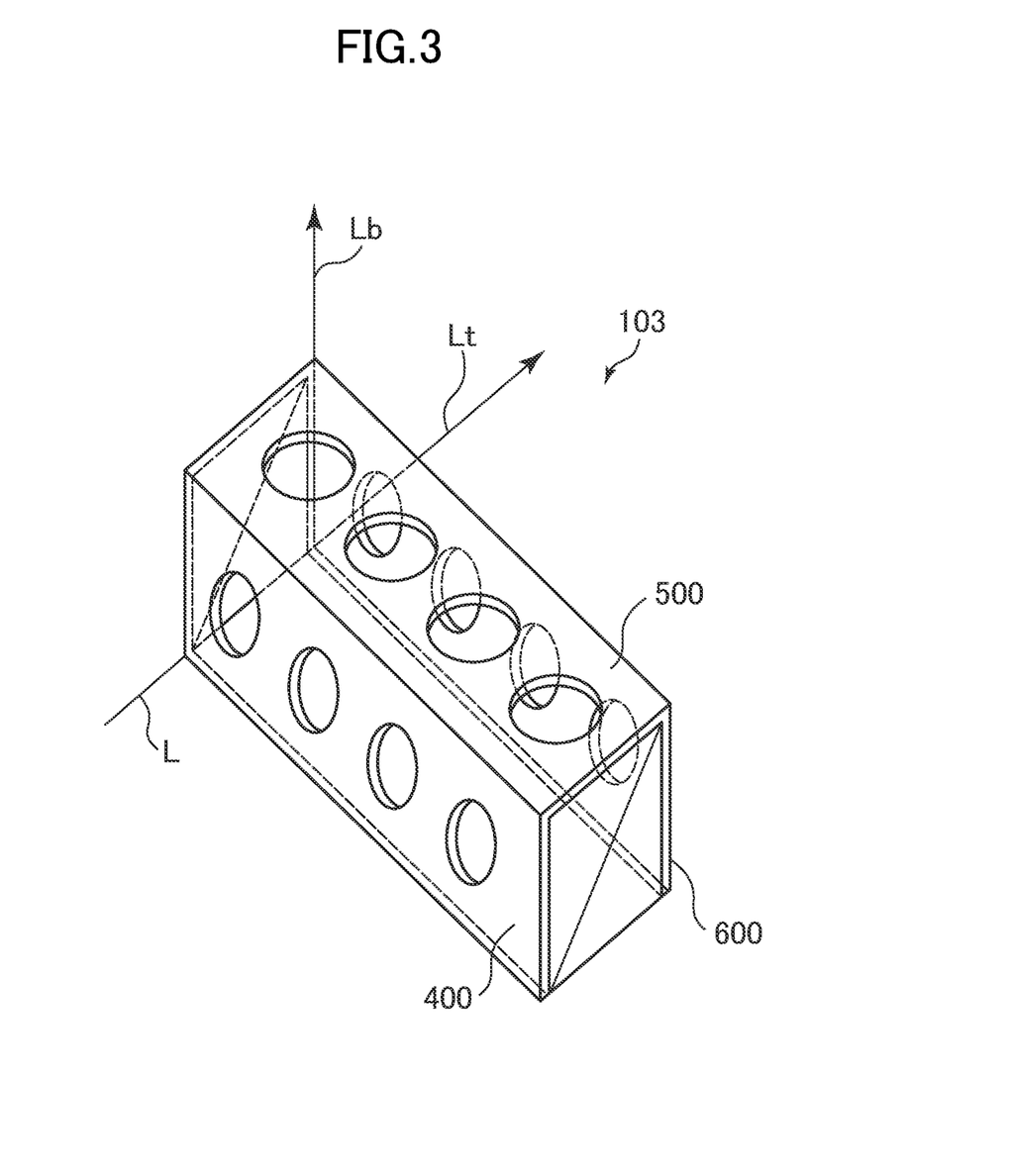
FIG. 3 is a perspective view showing a beam splitter used for the optical transmission module according to the first embodiment.

Moreover, as shown in FIGS. 1 to 3, the optical transmission module 10 according to the first embodiment may further include a second light-shielding film 500 provided between the plurality of light-receiving elements 300 and the beam splitter 103 and including a plurality of holes for the split light Lb to propagate to the light-receiving surfaces. The second light-shielding film 500 prevents stray light or the like that does not pass through the plurality of holes formed in the second light-shielding film 500 from entering the plurality of light-receiving elements 300.

Moreover, the second light-shielding film 500 may be directly formed on the side of the beam splitter 103 facing the plurality of light-receiving elements 300.

Similarly to the first light-shielding film 400, the second light-shielding film 500 may be formed by vapor depositing metal that reflects the light L emitted from the light-emitting element 200 on a base material forming the second light-shielding film 500, or may be formed using a material in which a compound or the like that absorbs the light L emitted from the light-emitting element 200 is dispersed.

More specifically, the second light-shielding film 500 may be formed by appropriately selecting a chemical vapor deposition method, a printing method, or a surface treatment method such as plating according to the material constituting the second light-shielding film 500. The second light-shielding film 500 may be formed using the same material as the first light-shielding film 400, or may be formed in the same process as the first light-shielding film 400.

The optical transmission module 10 according to the first embodiment including the second light-shielding film 500 suppresses the influence of stray light or the like entering the beam splitter 103 from the plurality of light-receiving elements 300 side of the beam splitter 103, so that an advantageous effect of the invention of the application is further increased.

Moreover, as shown in FIGS. 1 to 3, the optical transmission module 10 according to the first embodiment may further include a third light-shielding film 600 provided between the repeater 107 and the beam splitter 103 and including a plurality of holes for the transmitted light Lt to propagate to the repeater 107. The third light-shielding film 600 prevents stray light that does not pass through the plurality of holes formed in the third light-shielding film 600 from entering the plurality of light-receiving elements 300.

Moreover, the third light-shielding film 600 may be directly formed on the side of the beam splitter 103 facing the repeater 107.

Similarly to the first light-shielding film 400, the third light-shielding film 600 may be formed by vapor depositing metal that reflects the light L emitted from the light-emitting element 200 on a base material forming the third light-shielding film 600, or may be formed using a material in which a compound or the like that absorbs the light L emitted from the light-emitting element 200 is dispersed.

More specifically, the third light-shielding film 600 may be formed by appropriately selecting a chemical vapor deposition method, a printing method, or a surface treatment method such as plating according to the material constituting the third light-shielding film 600. The third light-shielding film 600 may be formed using the same material as the first light-shielding film 400, or may be formed in the same process as the first light-shielding film 400

The optical transmission module 10 according to the first embodiment including the third light-shielding film 600 suppresses the influence of stray light entering the beam splitter 103 mainly from the repeater 107 side of the beam splitter 103, so that an advantageous effect of the invention of the application is further increased.

Moreover, it is most preferred that the plurality of holes formed in the first, second, or third light-shielding film 400, 500, or 600 described above coincide with the shape of a cross-section of the light (L, Lb, or Lt) entering through the holes. By the way, the cross-section of the parallel light that has passed through the collimator lens 102 is generally ellipsoidal. Considering that the influence of entering of stray light is suppressed as much as possible, and also that the light emitted from the light-emitting element 200 is captured as much as possible, the plurality of holes formed in the first, second, or third light-shielding film 400, 500, or 600 may have a circular shape with a diameter corresponding to the size of the long side of the cross-section of the parallel light that has passed through the collimator lens 102.

Moreover, the optical transmission module 10 according to the first embodiment includes all of the first, second, and third light-shielding films described above, but may include only any one of the first, second, and third light-shielding films.

The optical transmission module 10 according to the first embodiment described above is configured such that, in the optical transmission module 10 provided with the plurality of light-emitting elements 200 and the plurality of light-receiving elements 300, each of the plurality of light-receiving elements 300 accurately monitors the light L emitted from the light-emitting element 200, and thus that the intensities of the lights L emitted from the plurality of light-emitting elements 200 are controlled so as to be more constant.

Second Embodiment

Hereinafter, an outline of an optical transmission module 20 according to a second embodiment of the invention will be described with reference to FIGS. 4 and 5. Configurations having the same functions as those of the optical transmission module 10 according to the first embodiment in FIGS. 1 and 2 are denoted by the same reference numerals and signs in FIGS. 4 and 5.

Figure 4:
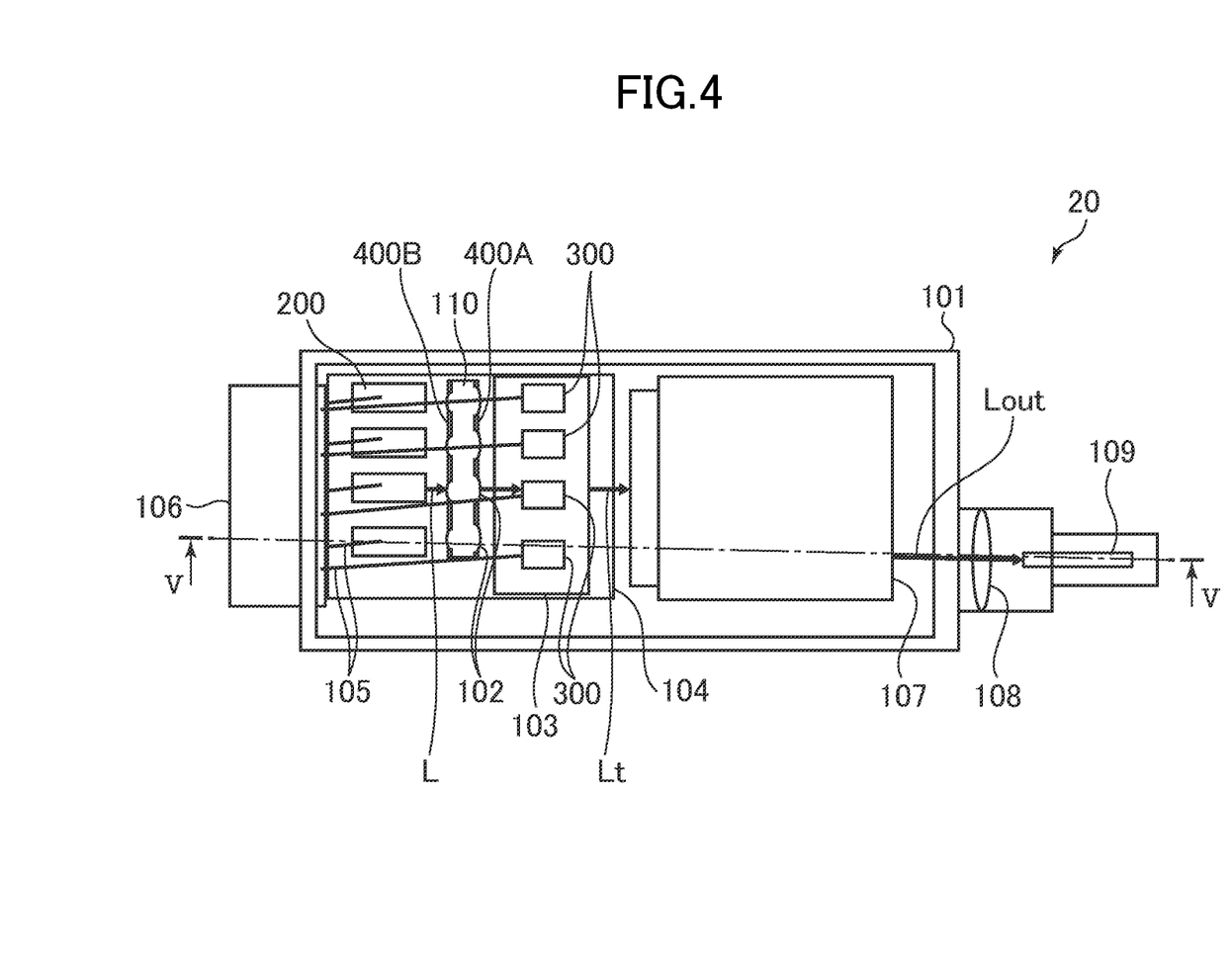
FIG. 4 is a diagram showing the state of the interior of an optical transmission module according to a second embodiment of the invention, viewed from above.

FIG. 4 is a diagram showing the state of the interior of the optical transmission module according to the second embodiment of the invention, viewed from above. FIG. 5 is a diagram showing a cross-section along the section line V-V in FIG. 4, showing the configuration of the optical transmission module according to the second embodiment.

The optical transmission module 20 according to the second embodiment is different from the optical transmission module 10 according to the first embodiment described above in that the first, second, and third light-shielding films are not directly formed on the beam splitter 103, and that a microlens array 110 provided between the plurality of light-emitting elements 200 and the beam splitter 103 and including a plurality of collimator lenses 102 that convert the light L to parallel light and are arranged side by side and coupled with each other is provided. The other configurations of the optical transmission module 20 according to the second embodiment are the same as those provided in the optical transmission module 10 according to the first embodiment.

Figure 5:
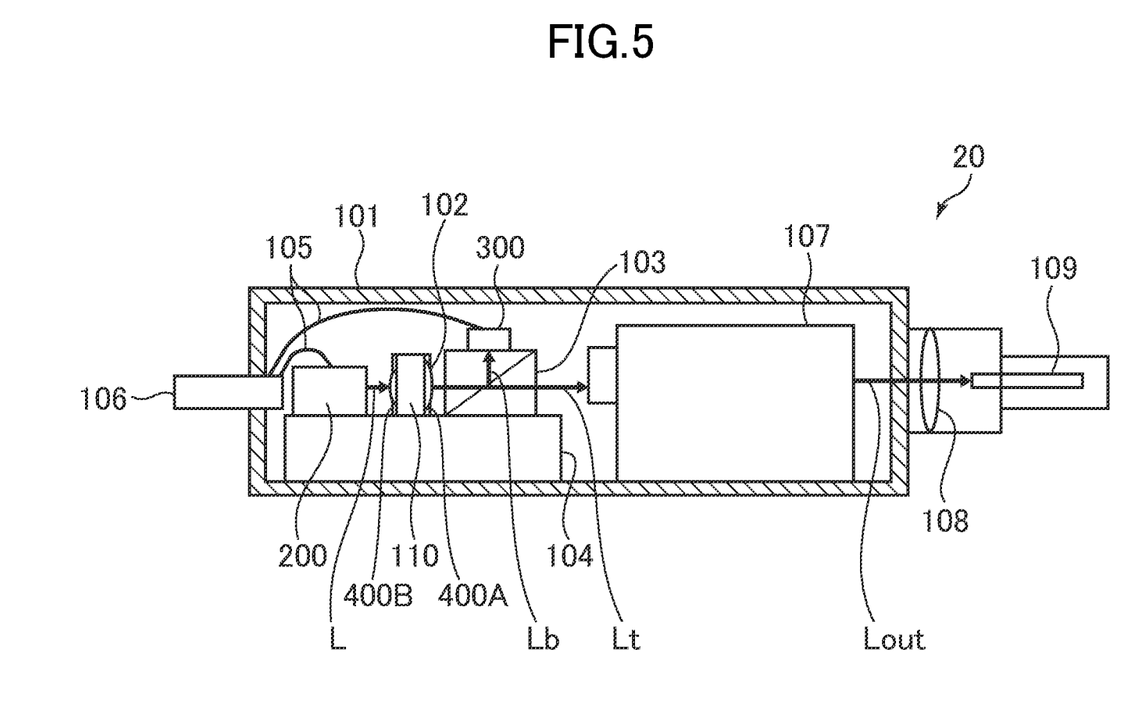
FIG. 5 is a diagram showing a cross-section along the section line V-V in FIG. 4, showing the configuration of the optical transmission module according to the second embodiment.

As shown in FIGS. 4 and 5, the optical transmission module 20 according to the second embodiment includes two first light-shielding films 400, one of which is provided between the microlens array 110 and the beam splitter 103, and the other is provided between the plurality of light-emitting elements 200 and the microlens array 110.

The first light-shielding film 400A provided between the microlens array 110 and the beam splitter 103 includes a plurality of holes for the parallel light converted by the collimator lens 102 to propagate to the beam splitter 103. The first light-shielding film 400B provided between the plurality of light-emitting elements 200 and the collimator lens 102 includes a plurality of holes for the light L, before being converted to the parallel light by the collimator lens 102, to propagate to the collimator lens 102.

Moreover, the first light-shielding films are directly formed on the side of the microlens array 110 facing the beam splitter 103 and on the side of the microlens array 110 facing the plurality of light-emitting elements 200, so as to fill the space between the collimator lenses 102 arranged side by side.

The first light-shielding film 400A of the first light-shielding films, which is provided between the microlens array 110 and the beam splitter 103, blocks a component of light L that has passed through the microlens array 110 but is not emitted as parallel light, and consequently suppresses the influence of stray light due to the component of the light, so that an advantageous effect of the invention of the application is further increased.

Moreover, the first light-shielding film 400B of the first light-shielding films, which is provided between the plurality of light-emitting elements 201 and the microlens array 110, blocks a component of light that is not incident on the microlens array 110 in the light emitted from the light-emitting element 200, and consequently suppresses the influence of stray light due to the component of the light, so that an advantageous effect of the invention of the application is further increased.

The phrase "not incident on the microlens array" as used herein means that light is not incident on a lens area (effective conversion area) where the light can be converted to collimated light.

Moreover, the optical transmission module 20 according to the second embodiment includes the two first light-shielding films 400, but may include only any one of the first light-shielding films 400.

Further, although, in the embodiment described above, the microlens array in which a plurality of microlenses are disposed in an array has been exemplified, the invention also includes the case where the plurality of microlenses limited to the microlens array are individually disposed in an array. In this case, the first light-shielding film may be disposed in an area other than the effective conversion area of the lens where incident light is converted to collimated light.

The optical transmission module 20 according to the second embodiment described above is configured such that, in the optical transmission module provided with the plurality of light-emitting elements 200 and the plurality of light-receiving elements 300, each of the plurality of light-receiving elements 300 accurately monitors the light emitted from the light-emitting element 200, and thus that the intensities of the lights emitted from the plurality of light-emitting elements 200 are controlled so as to be more constant.

Although an example of using the repeater 107 has been shown in each of the first and second embodiments, the idea of the invention of the application can be applied also to an optical transmission module not using the repeater 107.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical transmission module that converts an electric signal to an optical signal and outputs the optical signal, comprising:
    a package;
    a plurality of light-emitting elements each emitting light in the interior of the package;
    a beam splitter splitting the light into transmitted light and split light;
    a plurality of light-receiving elements each including a light-receiving surface on which the split light is incident in the interior of the package, for monitoring light outputs of the plurality of light-emitting elements; and
    a first light-shielding film provided between the plurality of light-emitting elements and the beam splitter and including a plurality of first holes for the light to propagate to the beam splitter, wherein
    the plurality of light-receiving elements are disposed with the light-receiving surfaces facing the beam splitter.

2. The optical transmission module according to claim 1, further comprising collimator lenses provided between the plurality of light-emitting elements and the beam splitter and converting the light to parallel light, wherein
    the first light-shielding film is provided between the collimator lenses and the beam splitter, and the plurality of first holes are formed so as to allow the parallel light to propagate to the beam splitter.

3. The optical transmission module according to claim 2, wherein
    the first light-shielding film is directly formed on a side of the beam splitter facing the collimator lenses.

4. The optical transmission module according to claim 1, further comprising a microlens array provided between the plurality of light-emitting elements and the beam splitter and including a plurality of collimator lenses converting the light to parallel light and arranged side by side, wherein
    the first light-shielding film is provided between the microlens array and the beam splitter, and the plurality of first holes are formed so as to allow the parallel light to propagate to the beam splitter.

5. The optical transmission module according to claim 4, wherein
    the microlens array is composed of the plurality of collimator lenses coupled with each other, and
    the first light-shielding film is directly formed on a side of the microlens array facing the beam splitter, so as to fill a space between the plurality of collimator lenses arranged side by side.

6. The optical transmission module according to claim 1, further comprising a microlens array provided between the plurality of light-emitting elements and the beam splitter and including a plurality of collimator lenses converting the light to parallel light and arranged side by side, wherein
    the first light-shielding film is provided between the plurality of light-emitting elements and the microlens array, and the plurality of first holes are formed so as to allow the light, before being converted to parallel light, to propagate to the plurality of collimator lenses.

7. The optical transmission module according to claim 6, wherein
    the microlens array is composed of the plurality of collimator lenses coupled with each other, and
    the first light-shielding film is directly formed on a side of the microlens array facing the plurality of light-emitting elements, so as to fill a space between the collimator lenses arranged side by side.

8. The optical transmission module according to claim 1, further comprising a second light-shielding film provided between the plurality of light-receiving elements and the beam splitter and including a plurality of second holes for the split light to propagate to the light-receiving surface.

9. The optical transmission module according to claim 8, wherein the second light-shielding film is directly formed on a side of the beam splitter facing the plurality of light-receiving elements.

10. The optical transmission module according to claim 1, further comprising:
a repeater for guiding the transmitted light in the interior of the package and transmitting the transmitted light to the outside; and
a third light-shielding film provided between the repeater and the beam splitter and including a plurality of third holes for the transmitted light to propagate to the repeater.

11. The optical transmission module according to claim 10, wherein
the third light-shielding film is directly formed on a side of the beam splitter facing the repeater.

* * * * *